__United States Patent Office__  3,137,841
Patented June 16, 1964

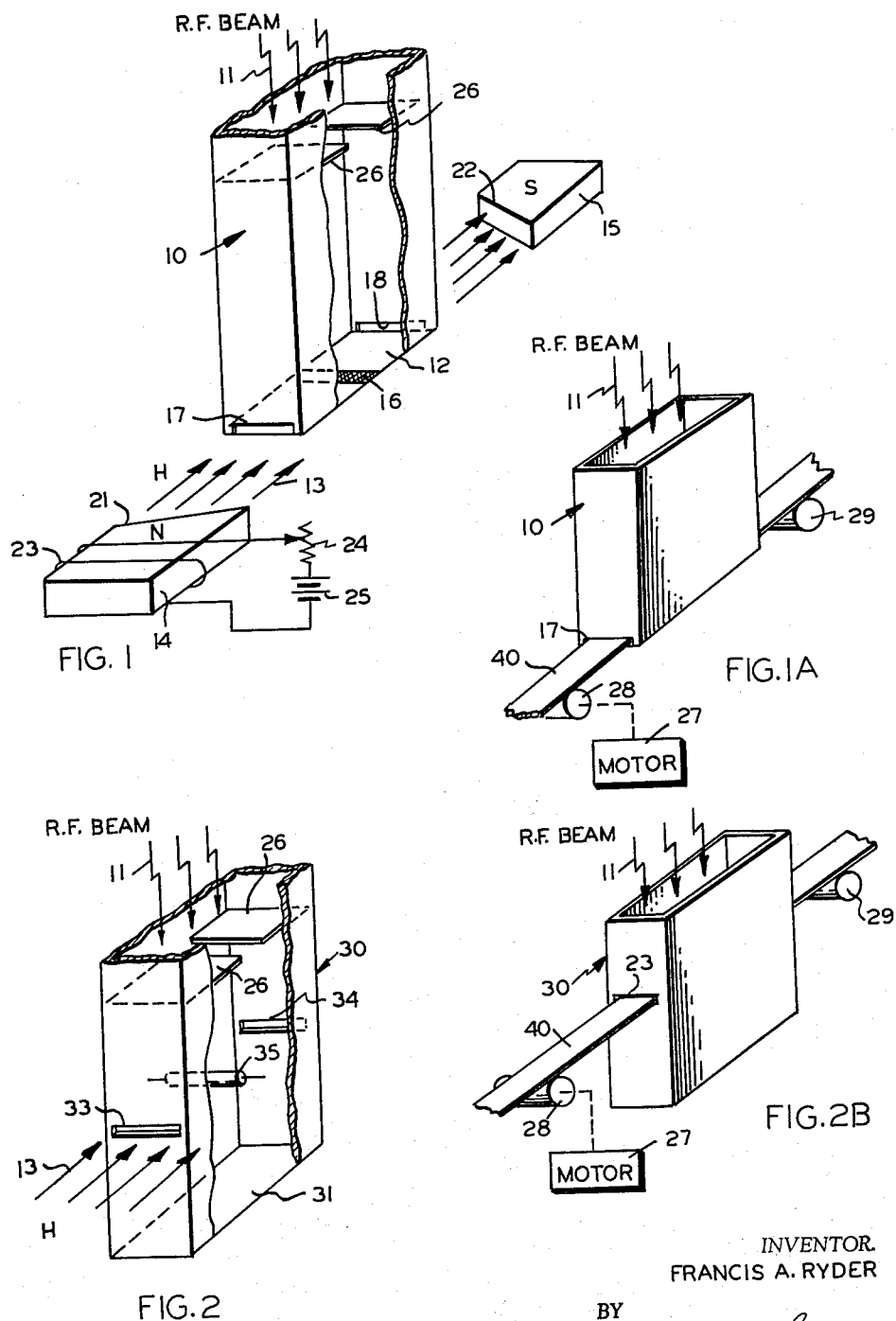

3,137,841
TRANSDUCER USING SPIN RESONANT
MATERIAL
Francis A. Ryder, Hyattsville, Md., assignor to
Litton Systems, Inc., Silver Spring, Md.
Filed July 2, 1963, Ser. No. 292,405
11 Claims. (Cl. 340—173)

This invention generally relates to transducers for electromagnetic signals at microwave frequencies, and more particularly to such transducers for converting time varying signals at these frequencies into frequency spectrum images, in the form of heat patterns, for such applications as recording the signal on heat sensitive records.

In a copending application of the same assignee, Serial No. 102,429, by Kenneth E. Peltzer, there is disclosed a microwave signal transducer for converting a time varying signal into frequency spectrum images, with each of the different component frequencies being located at a different position of the image. This transducer converts the microwave signal into heat by the use of frequency sensitive spin resonant materials that absorb energy from the microwave signal and reradiate the absorbed energy at a different frequency, such as in the form of heat. The heat images being produced are recorded by applying the transducer to a heat sensitive record or tape.

According to the present invention, there is provided transducers for this function, that are incorporated within waveguides or resonant cavities, and with the parts therein being arranged in such manner as to maximize the quality of the recording and minimize the spurious heating of the record and spin resonant material. More specifically, it has been found that when transducing and recording microwave beams at these very high frequencies, it is desired to minimize the electric vector component of the beam in the recording zone; since this electric vector produces spurious microwave heating in the heat sensitive recording medium and in the spin resonant material in conflict with the desired recording of intelligence by the magnetic vector. To separate the electric and magnetic vectors, the present invention disposes the spin resonant material at a position within the cavity having a minimum electric field vector, such as at a short circuited wall, or at a nodal point of the electrical component of the wave.

In addition to minimizing the high frequency spurious heating problem, the present invention also provides an improved arrangement of the spin resonant material within a waveguide or cavity in such manner that a continuous heat sensitive tape may be conveyed through the waveguide in heat transfer relationship to the spin resonant material to record a successive series of images on the tape.

It is accordingly a principal object of the invention to provide a waveguide or resonant cavity transducer for microwave signals.

A further object is to provide such a transducer for enabling the continuous or continual recording of the signal in the form of spectral frequency images along a moving tape.

A still further object of the invention is to provide a transducer for radiant microwave frequency energy, providing a minimized distortion of the electro-magnetic wave.

Still another object is to provide such a transducer for recording an electromagnetic wave at microwave frequencies on a nonconducting recording member and having minimized spurious heating of the recording medium by the electrical vector in the wave.

Other objects and many additional advantages will be more fully appreciated by those skilled in the art after a detailed consideration of the following specification taken with the accompanying drawings wherein:

FIG. 1 and FIG. 1A are perspective views, partly in section, and illustrating one preferred recording transducer according to the invention, wherein the spin resonant material is supported on an end wall of the waveguide or cavity; and FIG. 2 and FIG. 2A are perspective views illustrating an alternative embodiment of the recording transducer according to the present invention, wherein the spin resonant material is disposed at a nodal point of the electric vector of the electromagnetic wave.

Referring to the drawings, there is shown in FIG. 1 one preferred recording transducer according to the present invention, with the cavity being cut away to illustrate its internal structure, and in FIG. 1A an outer view of this transducer showing the manner of feeding an elongated recording tape 40 therethrough. As shown in FIG. 1, the transducer is comprised of a rectangularly shaped waveguide forming a cavity 10, that is open at one end to receive an electromagnetic wave or radio beam 11, and closed at the other end by a conducting wall 12 to terminate the cavity. The side walls of the waveguide and the end wall 12 are preferably formed of an electrically conducting but nonmagnetic material such as aluminum, and a pair of magnets 14 and 15 are located externally of the waveguide to produce a low frequency or static magnetic flux 13 that penetrates through the walls of the waveguide at the position of the end wall 12.

Supported on the short circuiting end wall 12, there is provided a stripe or thin bar of spin resonant material 16, with the bar 16 being oriented across the waveguide and substantially parallel to the narrow side walls and equally spaced therebetween. The external magnetic poles 14 and 15 are located in alignment with the end wall 12 and direct the lines of magnetic flux 13 transversely through the layer of spin resonant material 16 along its entire length, as shown.

For introducing a recording tape 40 through the transducer, and in contact with the layer 16 of spin resonant material, a pair of slots 17 and 18 are formed at the ends of the side walls of the waveguide, as shown, and are oriented parallel to the layer of spin resonant material 16. As best shown in FIG. 1, the recording tape 40 is, therefore, introduced into and withdrawn from the cavity through the slots 17 and 18, and passes over and in contact with the spin resonant layer 16.

To transduce and record a frequency spectrum image on the tape 40, the magnetic poles 14 and 15 are provided with specially formed pole faces 21 and 22, respectively, that are progressively inclined away from each other in a direction along the length of the spin resonant material layer 16, thereby to produce a nonhomogeneous or nonuniform magnetic field 13 along the length of the spin resonant layer 16. By this construction, the spatial intensity of the magnetic field 13 is, therefore, progressively varied along the length of the stripe 16 to provide a more intense magnetic field at one end position thereof where the poles are close together, and a progressively decreasing magnetic intensity along the length of the stripe 16. Other magnet constructions for producing this or other nonuniform or nonhomogeneous magnetic fields are also known to those skilled in the art.

As is more fully discussed in the prior application referred to above, the class of spin resonant materials employed according to the invention are characterized as being those materials that are frequently sensitive to the magnetic vector component of microwave electromagnetic signals, and function to absorb energy from the signal at the frequency to which they have been tuned, and to reradiate the absorbed energy at a different wavelength, such as in the form of heat. The frequencies at which such materials respond may be variably tuned in proportion to the intensity of a static or low frequency magnetic field 13 that is simultaneously applied to the material, according to the Lamour energy relationship. Consequently, by varying the intensity of the static magnetic field 13, these materials will respond to or be tuned to absorb different frequencies. Thus, by providing a nonhomogeneous magnetic field 13, which progressively varies in intensity along the length of the spin resonant layer 16, each different position along this length is tuned to a different frequency of the incoming electromagnetic beam 11 and responds only to its tuned frequency. The functioning of the material at its tuned frequency is similar to that of a resonant circuit, so that energy is absorbed from the signal at the tuned frequency and reradiated in the form of heat.

In operation, the nonuniform magnetic flux 13 being produced by the magnets 14 and 15, is initially preselected or adjusted by such means as adjusting the amplitude of current through the winding 23 about the magnet 14, to tune the spin resonant bar 16 to respond to a preselected bandwidth of frequencies. An electromagnetic beam 11 to be recorded is then introduced into the open end of the cavity 10 and passed through a coupling iris being provided by the separated plates 26 within the cavity, to illuminate the stripe or bar 16 of spin resonant material.

As is well known by Fourier's analysis, a time varying beam is basically comprised of a series of different component frequencies, so that the variably tuned spin resonant stripe 16 functions to simultaneously separate the different component frequencies in the beam 11 and to absorb the different components at different positions along the length of the stripe 16 that have been tuned to that component frequency. As a result, there is repetitively produced in the layer 16, a series of spatial heat patterns corresponding to the different frequency spectrums of the radio beam 11, which patterns are successively produced and decay in the spin resonant material according to the time variations of the radio beam 11.

For recording these spatial heat patterns representing the time changes in the beam, the heat sensitive tape 40 is successively brought into heat transferring relationship with the stripe 16, and responds to the heat images being produced in the stripe 16 to record the frequency spectrum patterns as separate images. As shown in FIG. 1A, this heat sensitive tape 40 is introduced and withdrawn through the slots 17 and 18 of the cavity and guided over the short circuiting end wall 12 to pass over and contact the layer 16 of spin resonant material. The tape 40 may be continuously or continually fed through the transducer to record a successive series of such frequency spectrum images, by such means as using a drive motor 27 and drive rollers 28 and 29 as shown, and as is conventional in ordinary tape drive systems.

In recording radio beams by the transducer described, it is noted that the heat sensitive tape 40 is passed through the cavity and exposed to the radio beam 11 in order to contact the layer 16 of spin resonant material. In the construction of such tapes, it is most common to employ nonconductive materials for the tape base, such as the plastic Mylar, which has good wearing abilities and rather high strength. However as is well known, such nonconductive materials are heated when exposed to the electric vector of a high frequency radio beam, and such spurious heating of the tape base affects the heat sensitive layer carried by the tape to obscure the recording of the intelligence heat patterns.

To minimize any such spurious heating of the recording tape according to the present invention, the spin resonant layer 16 is located within the cavity at a position where the amplitude of the electric field vector of the radio beam 11 is at a minimum or at a nodal region, and conversely, where the magnetic field vector of the beam 11 is at a maximum amplitude. In the embodiment of FIGS. 1 and 1A, this is performed by supporting the spin resonant layer 16 directly on the short circuiting end wall 12 of the cavity, since at this wall 12, the electric vector is short circuited and substantially at a minimum amplitude whereas the magnetic vector is at a maximum. Thus, by constructing the transducer in this manner, the recording tape 40 being directed through the beam 11 is substantially unaffected by spurious high frequency heating of the tape base, as is the spin resonant layer 16 that is continually subjected to the beam 11.

Still another advantage of introducing the tape along the short circuiting end wall 12 of the cavity, is that at this location of the cavity the tape does not introduce any anomalies that might tend to distort the radio beam 11, and thereby result in errors in the recorded images.

FIGS. 2 and 2A illustrate another construction of the transducer according to the present invention providing the same advantages. In this embodiment, the spin resonant material is supported on a guide roller 35 that is rotatably mounted within the cavity 30 at a position in line with the coupling iris provided by the separated plates 26, thereby to be uniformly illuminated by the incoming radio beam 11. The tape 40 is introduced into the cavity 30 by means of slots 33 and 34 in the opposite narrow walls of the cavity that are aligned in parallel to the axis of roller 35. By maintaining a reasonable degree of tension on the tape, the slots 33 and 34 and the roller 35 serve to guide the tape 40 in passing through the cavity 30, and maintain the tape in heat transferring relationship with the roller 35 containing the spin resonant material.

To reduce or eliminate any high frequency spurious heating of the tape 40 by the electric vector of the radio beam 11, the roller 35 is disposed at a nodal point of the electric field vector in the standing wave of the beam; and, as is well known, the tape 40 therefore receives the maximum amplitude of the magnetic component of the wave, and the minimum amplitude of the electric field vector, as is desired.

The construction of the transducer may be otherwise the same as in the embodiment of FIGS. 1 and 1A; and for frequency tuning the spin resonant roller 35, there is provided a nonuniform magnetic field 13 energizing the roller 35 to provide a frequency spectrum transducing of the radio wave 11 in the same manner as described in FIG. 1. The waveguide 30 is also provided with a short circuiting end wall 31 to complete the resonant cavity construction.

In the preferred transducer illustrated in FIGS. 1 and 2, a rectangularly shaped waveguide cavity is disclosed that may be constructed in the $TE_{102}$ mode that will properly support the radio beam 11 and provide the resonant cavity desired. However, it will be understood that various other cavity constructions may be employed as well as different configurations of the spin resonant bar, different manners of introducing the tape into the cavity and many other changes without departing from the concepts of the invention.

As is discussed more fully in earlier applications of the same assignee, S.N. 95,531, filed March 14, 1961; and S.N. 59,342, filed September 29, 1960; a rather large number of different types of spin resonant materials may be employed in the practice of the invention, including various crystal materials, free radical materials, and other known electron spin resonant materials that possess numerous unpaired electrons, or nuclear spin resonant materials having nuclei that possess a net magnetic moment. Such materials are available in either solid, liquid, or gaseous form and a number of such materials are stable at ambient or room temperature. One preferred free radical material for use as the spin resonant bar or layer 16 is (DPPH) Diphenylpicrylhydrazyl, which is obtainable on the open market in solid particle form and may be easily provided as a thin coating or layer 16 as in FIG. 1, or as a solid bar; or may be coated on or embedded in a porous roller 35 as in the embodiment of FIG. 2. On the other hand, if it is desired to employ other ones of the spin resonant materials that are available in liquid or gaseous form and discussed in the earlier applications above, such material may be enclosed within a container (not shown) having walls of heat transferring material, thereby enabling the transfer of the heat image through the walls to the heat sensitive tape 40.

With respect to the heat sensitive recording tape 40, a large number of heat sensitive materials are also well known that may be employed in practicing the invention, and are presently available commercially under the general name of thermographic materials. One such heat sensitive material that produces a change of color to black of fairly good quality when exposed to elevated temperatures, is comprised of 30% of urea; 10% of nickel acetate; 3% of thiourea, and 57% of water. This composition may be applied as a coating to a suitable tape base, such as Mylar tape, by dip squeezing or flow coating this liquid composition over the tape base and then drying the tape to produce the desired heat sensitive upper layer on the tape. A large number of other heat sensitive materials are also available that produce change of color with heat, or otherwise vary their electrical or physical properties when heated, and accordingly this invention is not to be considered as being limited to any specific heat sensitive material.

In using various ones of these heat sensitive materials, the critical temperature or temperature range that is required to effect a change in the color or other detectable change in the material may be greater than can be obtained from the heat pattern of intelligence being produced by the spin resonant material 16. When using such tapes, a preheater (not shown) may be provided externally of the transducer in the form of a separate heating coil or the like, to preheat the tape 40 to a temperature just under this critical temperature or range. When the heat pattern being produced in the spin resonant material 16 is then applied to the tape 40, the temperature of the tape at the discrete locations forming the desired heat image, will be sufficiently raised to exceed this critical temperature and thereby effect a recording of the heat image, as is desired.

Although but two preferred embodiments of the transducer has been disclosed, it is believed evident to those skilled in the art that many variations may be made without departing from the scope of this invention. For example, in illuminating the tape of the radio beam 11, various other iris constructions or focusing means may be substituted for the pair of spaced plates 26 as shown; the radio beam 11 may also be introduced by means of dipoles or other radiators within a closed resonant cavity; the tape may be guided and conveyed into the resonant cavity in a different manner; and the cavity itself may be variously constructed to support different modes or radio beam transmission, all depending upon the specific application for the transducer. Many other magnet and electromagnet constructions may also be used for producing the low frequency magnetic field 13, and for tuning this magnetic field to change the frequency response characteristics of the spin resonant stripe. For example, various configurations of permanent magnets and electromagnets as well as combinations of these may be employed, having different pole face constructions. Alternatively, a series of separate magnets may be employed to provide the different intensity magnetic fields for frequency spectrum transducing as might be desired. Since these and many other changes may be made without departing from the spirit and scope of this invention, this invention is to be considered as being limited only according to the following claims appended hereto.

What is claimed is:

1. A recording transducer for radio beams in the microwave band of frequencies comprising: a microwave cavity for receiving the radio beam and providing a standing wave pattern therein, a frequency sensitive spin resonant material that is absorptive of radio frequency energy in the microwave band being supported within the cavity at a location having a minimum amplitude of the electric field vector and a maximum amplitude of the magnetic field vector of the standing wave, magnet means for applying a low frequency magnetic field to the spin resonant material to tune the material into frequency sensitivity with the radio beam, said cavity being provided with openings in associated alignment with the spin resonant material to receive an elongated recording tape which is introduced into and withdrawn from the microwave cavity, and said cavity including means for guiding the tape into heat transfer relationship with the spin resonant material, whereby the recording tape is introduced and excited through said openings and is disposed in energy transferring relationship with the spin resonant material within the cavity to receive heat images therefrom.

2. In the transducer of claim 1, said cavity comprising a waveguide being terminated by a conducting wall to provide a minimum electric field vector at the wall, said spin resonant material being supported by the wall, and said openings in the waveguide being disposed in associative alignment with the wall to provide a support for guiding the recording tape through the waveguide and against the wall and in direct contact with the spin resonant material.

3. In the transducer of claim 1, a roller member being rotatably supported within the waveguide and having such spin resonant material being supported on the roller, and said openings in the waveguide being disposed in confronting relationship with the roller whereby the roller functions to both supportably guide the recording tape in passing through the waveguide and to apply the heat images thereto.

4. In the transducer of claim 3, said roller member being disposed within the waveguide at a position where a minimum electric field vector exists.

5. A transducer for radio waves in the microwave band of frequencies comprising: a waveguide section for receiving the radio waves to be transduced, a frequency sensitive spin resonant material being disposed within the waveguide at a location where a minimum electric field vector of the wave exists, means for producing a nonuniform low frequency magnetic field to energize different positions along the spin resonant material with different intensities, thereby to tune different positions of the spin resonant material into energy absorptive relationship with different frequencies of the wave, said spin resonant material being characterized as absorptive of energy from the wave at the tuned frequency thereby to reradiate the absorbed energy in the form of heat, said waveguide being provided with means for introducing a heat sensitive recording medium therein in heat transfer relationship with the spin resonant material, thereby to permit transfer of heat images from the spin resonant material to the medium.

6. A recording transducer for high frequency signals comprising: means defining a cavity for receiving and guiding the signal, a spin resonant material supported in a fixed position with respect to the cavity where the electric vector of the signal is minimized whereby the fixed spin resonant material is exposed primarily and repetitively to the magnetic vector of the signal, means producing a magnetic field for energizing said spin resonant material in resonant reactive relationship with the signal, and means associated with the cavity for guiding different positions of an elongated recording medium into successive image transferring relationship to the spin resonant material.

7. A recording transducer for converting a high frequency signal into an intelligence heat image and reducing spurious high frequency heating comprising: means defining a cavity to receive the signal, a spin resonant material supported at a fixed location with respect to the cavity where the magnetic component of the signal is maximum and adapted to be continually exposed to the signal to produce a repetitive intelligence heat pattern corresponding to variations of the magnetic component, and means for selectively tuning the spin resonant material into reactive relationship with the magnetic component.

8. In the transducer of claim 7, means for successively exposing a heat responsive recording tape to the spin resonant material to transfer the heat images thereto.

9. In the transducer of claim 8, said tuning means tuning different positions of spin resonant material into reactive relationship with different frequencies of the magnetic component.

10. A recording transducer for radio waves in the microwave band of frequencies comprising: a resonant microwave cavity for receiving the radio waves, a spin resonant material supported within the cavity for illumination by the wave, means for guiding a recording medium into the cavity and in image transferring relationship to the spin resonant material, and means for tuning the frequency of the spin resonant material by a low frequency magnetic field into energy absorptive relationship with preselected frequencies in the radio wave, said spin resonant material being supported within the cavity at a position where a minimum electric field vector of the radio wave exists.

11. A recording transducer for radio waves in the microwave band of frequencies comprising: a resonant microwave cavity for receiving the radio waves, a spin resonant material supported within the cavity for illumination by the wave, means for guiding a recording medium into the cavity and in image transferring relationship to the spin resonant material, and means for tuning the frequency of the spin resonant material by a low frequency magnetic field into energy absorptive relationship with preselected frequencies in the radio wave, said spin resonant material being supported on a rotatable roller member that is pivotally mounted within the cavity at a location where a minimum electric vector of the radio wave exists.

References Cited in the file of this patent
UNITED STATES PATENTS 2,952,503     Becker _____ Sept. 13, 1960